United States Patent [19]

Asai et al.

[11] 4,202,196
[45] May 13, 1980

[54] METHOD OF MANUFACTURING STATOR CORE

[75] Inventors: Koichi Asai; Tohsuke Kawada, both of Chiryu; Yoshiyuki Iwaki; Ryozo Kuroda, both of Himeji, all of Japan

[73] Assignee: Mitsubishi Denki Kabushiki Kaisha, Tokyo, Japan

[21] Appl. No.: 923,400

[22] Filed: Jul. 10, 1978

[51] Int. Cl.² .................. H02K 15/00; B21D 11/06
[52] U.S. Cl. .......................... 72/137; 29/596; 29/605; 72/142
[58] Field of Search .................. 29/596, 605, 609; 72/135, 137, 142, 354, 363

[56] References Cited

U.S. PATENT DOCUMENTS

| | | | |
|---|---|---|---|
| 3,062,267 | 11/1962 | Hart et al. | 72/142 |
| 3,152,629 | 10/1964 | Rediger | 72/142 |
| 3,206,964 | 9/1965 | Hart et al. | 72/142 |
| 3,283,399 | 11/1966 | Hart et al. | 29/605 |
| 3,842,493 | 10/1974 | Ochuchi et al. | 29/596 |
| 3,958,325 | 5/1976 | Rick et al. | 29/596 |
| 4,079,512 | 3/1978 | Lakes | 29/596 X |
| 4,116,033 | 9/1978 | Iwaki et al. | 72/142 |

*Primary Examiner*—Ervin M. Combs
*Attorney, Agent, or Firm*—Wenderoth, Lind & Ponack

[57] ABSTRACT

A stator core including a central cylindrical opening defined by a plurality of teeth consecutive through a circumferential continuous portion is prepared by winding a magnetic strip having a corresponding shape into a spiral. A forming cylindrical rod having a diameter larger than the inside diameter of the core is forced into that opening, and then a pressure is axially applied to the core to compress it to level the beginning and last edges of the strip. The rod is removed from the core and the pressure is released to complete the stator core having a predetermined inside diameter.

8 Claims, 13 Drawing Figures

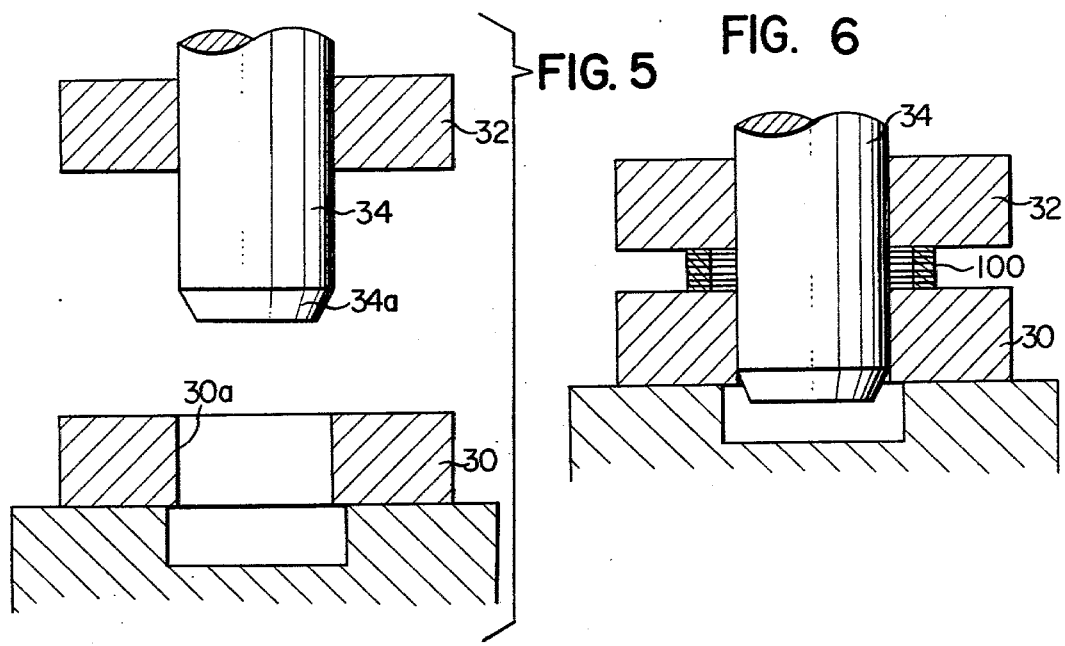
FIG. 5
FIG. 6
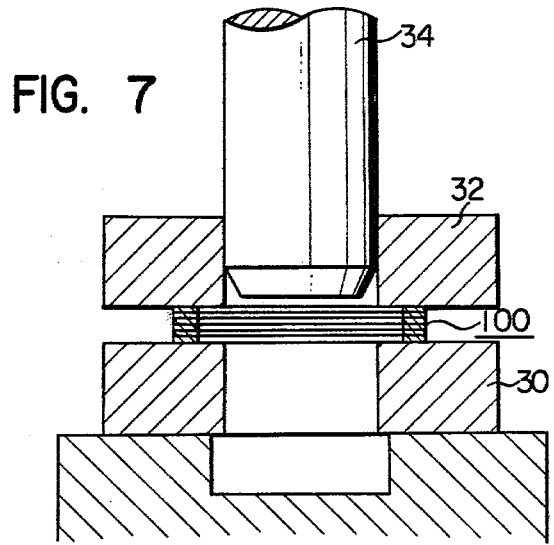
FIG. 7
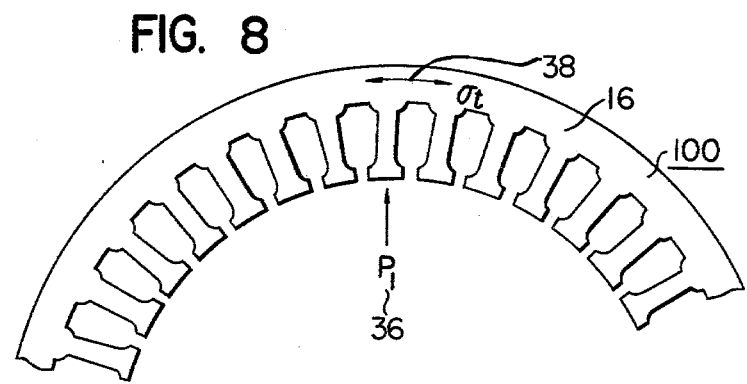
FIG. 8

FIG. 9
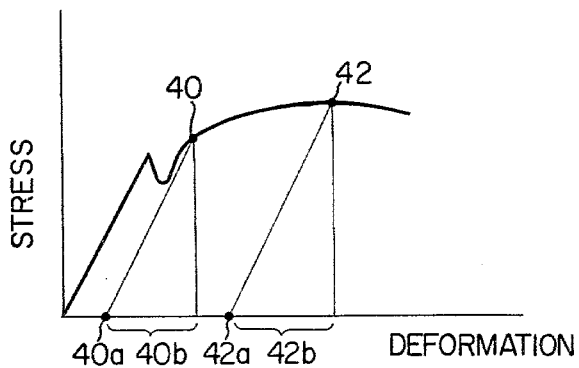
FIG. 10
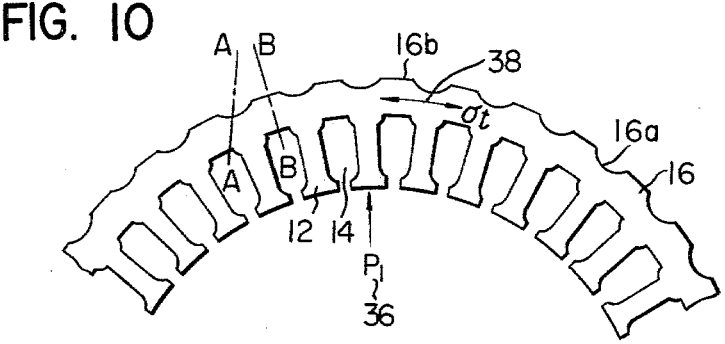
FIG. 11
FIG. 12
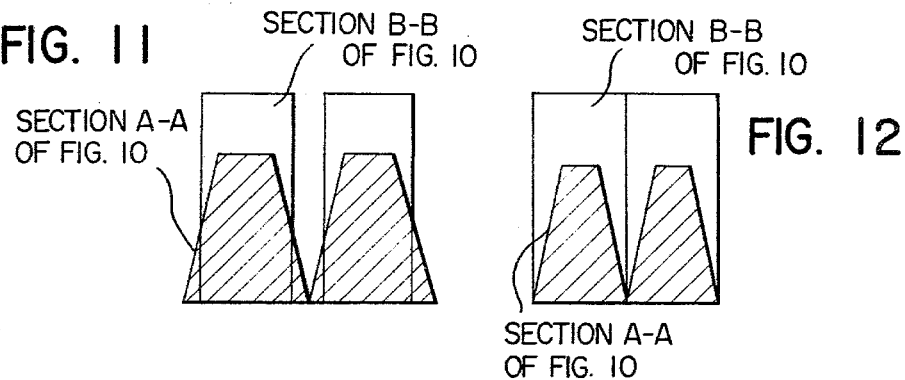
FIG. 13
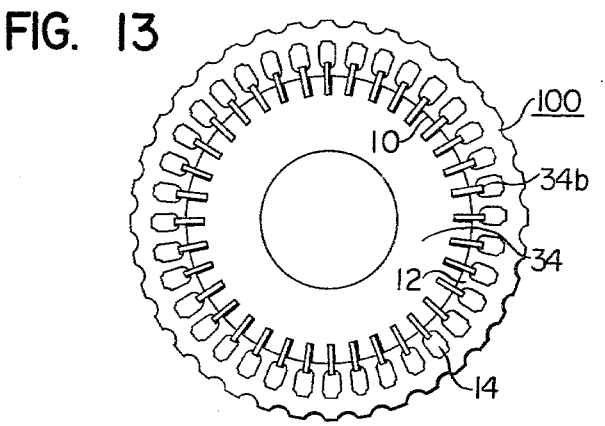

METHOD OF MANUFACTURING STATOR CORE

BACKGROUND OF THE INVENTION

This invention relates to a method of manufacturing stator cores by winding magnetic strip into spirals.

After stator cores formed by winding a magnetic strip into spirals have been finally formed, the cores are generally subjected to the steps of winding coils thereon and machining the fitting portions thereof into end-flames of an alternator. However, due to working errors occurring upon stamping the magnetic strip, and variations in thickness locally developed on the magnetic strip itself, conventional methods of forming stators have resulted in an unsatisfactory accuracy concerning the inside diameter of the inner surface of stators formed of teeth and adapted to be opposite an associated rotor. Therefore, it is the existing state of the art that the inside diameter of such stators must be adjusted by suitable means, for example by finishing by a lathe. In addition, the conventional shaping methods have been disadvantageous in that, it is difficult to effectively shape stators because, upon spirally winding the magnetic strip, a rectangular cross section thereof changes to a trapezoidal cross section, resulting in unstable stacked or laminated structures.

It is an object of the present invention to provide a new improved method of economically manufacturing a stator core by spirally winding a magnetic strip which method produces a stable laminated structure to thereby render the forming of the structure effective while increasing the accuracy of the inside diameter of the core enough to eliminate the necessity of later adjusting the inside diameter.

SUMMARY OF THE INVENTION

The present invention provides a method of manufacturing a stator core including a central opening defined by an inner surface thereof consisting of a plurality of teeth consecutive through a circumferentially continuous portion thereof by winding a magnetic strip having a corresponding shape into a spiral, the inner surface of the core being disposed to oppose to an associated rotor. The method comprises the steps of forcing a cylindrical tool having a diameter larger than an inside diameter of the central opening into such opening and then compressing the core axially thereof, to thereby impart permanent strains to the circumferential continuous portion of the core to maintain the inside diameter of the core at a predetermined magnitude.

BRIEF DESCRIPTION OF THE DRAWINGS

The present invention will become more readily apparent from the following detailed description taken in conjunction with the accompanying drawings in which:

FIGS. 5a and 5b are longitudinal sectional views of a forming device embodying the principles of the method of the present invention with a part thereof illustrated in elevation;

FIGS. 6 and 7 are longitudinal sectional views illustrating a forming process employing the arrangement shown in FIG. 5;

FIG. 8 is a fragmental plan view of a stator core formed by the process shown in FIGS. 6 and 7 illustrating the dynamic relationship developed therein;

FIG. 9 is a graph illustrating the relationship between a stress and a deformation developed in the core shown in FIG. 8;

FIG. 10 is a fragmental plan view of a modification of the core of FIG. 8;

FIG. 11 is a fragmental cross sectional view of the core of FIG. 10 before its forming as taken along the lines A—A nd B—B of FIG. 10;

FIG. 12 is view similar to FIG. 11 but illustrating the core after its forming; and FIG. 13 is a plan view of another modification of the present invention.

DESCRIPTION OF THE PREFERRED EMBODIMENTS

Figure 1:
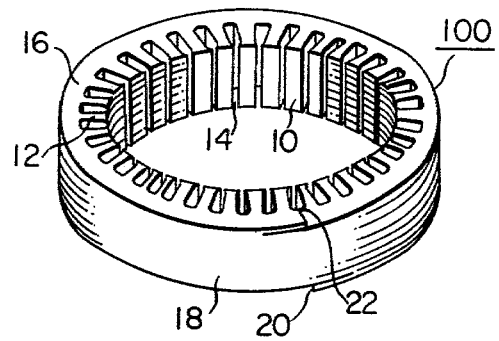
FIG. 1 is a perspective view of a wound type stator core before the forming thereof.

Referring now to FIG. 1 of the drawings, there is illustrated a wound type stator core formed of a magnetic strip wound into a spiral. In the arrangement illustrated a stator core generally designated by the reference numeral 100 is not yet completely formed and comprises an inner cylindrical surface 10 including a plurality of protrusions (which are called hereinafter "teeth") 12 disposed at predetermined equal angular intervals and alternating radial gaps 14, and a circumferential continuous portion 16 integral with the teeth 12 to maintain the latter consecutive. The continuous portion 16 terminates at an outer cylindrical surface 18 coaxial with the inner cylindrical surface 10 that is adapted to be opposed to an associated rotor (not shown).

It will readily be understood that the core 10 is formed by winding spirally a magnetic strip in such a manner that a multiplicity of rectangular teeth and alternating cross gaps on one of the longitudinal edge portions of the strip are aligned with the teeth directed radially inward and with the teeth on each convolution of the strip superposing those on the overlaid and underlaid convolutions thereof.

Figure 2:
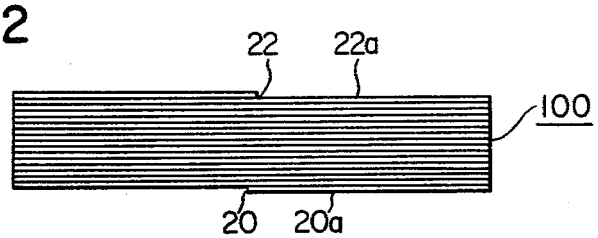
FIG. 2 is a side elevational view of the stator core as shown in Figure illustrating differences in level occurring at the beginning and finish of winding of the core.

As best shown in FIG. 2, the magnetic strip would into a spiral includes a first convolution 20a starting with the beginning 20 of winding thereof forming a difference in level with a second convolution and the finish 22 forming a difference in level with that convolution overlaid with the last convolution 22a thereof.

Upon manufacturing the stator core as shown in FIGS. 1 and 2, conventional methods of forming the core have included a compression step only, for the purpose of levelling or removing the differences in level occurring at the beginning 20 and the finish 22 of winding of the magnetic strip. This is because it has been assumed in the prior art that the inner surface 10 inevitably has variations due to the working operation.

Figure 3:
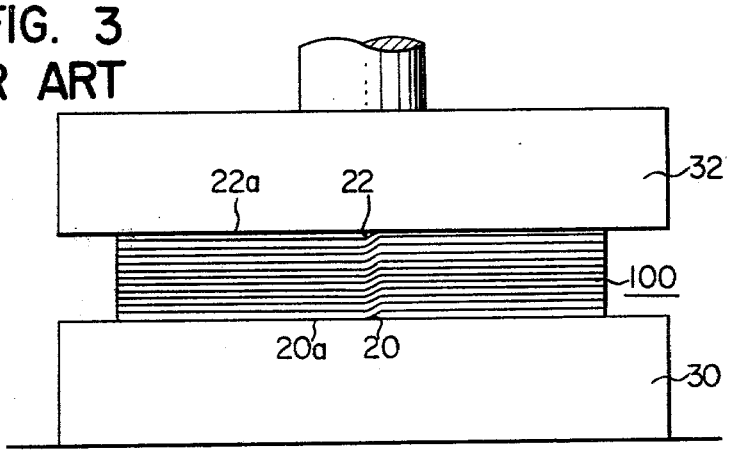
FIG. 3 is a side elevational view of a forming device embodying the principles of the prior art.

FIG. 3 shows the manner in which the stator core 100 is compressed and formed according to a conventional method. In FIG. 3, the core 100 is disposed on a first flat plate 30 located, for example, on a hydraulic press and overlaid with a second flat plate 32 secured to a plunger thereof, although the hydraulic press is not illustrated for clarity of illustration. Thus the core 100 is compressed between both flat plates 30 and 32, whereby each convolution or layer is curved in a line connecting the beginning and finish of winding of the strip until a plane on the side of the first convolution 20a becomes parallel to that on the side of the last convolution 22a. This results in the completed stator core.

Figure 4:
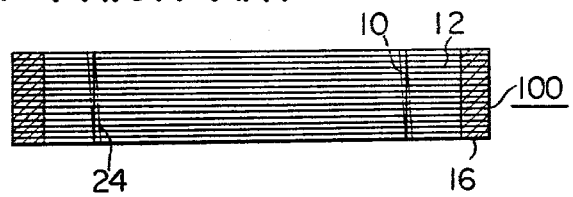
FIG. 4 is an elevational sectional view of a wound type stator core as formed according to a conventional forming method illustrating those portions of the core requiring a later working operation in order to correct a variation in inside diameter and an inclination of the inner core surface.

As will readily be apparent from FIG. 3, an error of the inside diameter of the core 100 occurring upon winding the magnetic strip remains intact after the forming operation and further the cylinder defined by the inner surface 10 is inevitably inclined to the original longitudinal axis thereof. This has resulted in the necessity of additionally working the compressed core by any suitable means such as a lathe in order to compensate for the error and inclination. For example, FIG. 4 shows that portion 24 of the core 100 removed as by a lathe. In this way the stator core has been completed according to prior art methods.

Referring now to FIG. 5, there is illustrated a forming device embodying the forming method of the present invention. The arrangement illustrated comprises a first flat plate 30 disposed on a stationary bed of a hydraulic press, and a second flat plate 32 fixedly secured to a movable portion of the press to oppose to the first flat plate 30, although the hydraulic press is not illustrated for clarity of illustration. The second flat plate 32 includes a circular opening through which a cylindrical tool 34, in this case a forming cylindrical rod, is slidably extended. The forming rod 32 has an outside diameter larger than the inside diameter of stator cores not yet subjected to the forming operation, such as shown in FIGS. 1 and 2, and includes a tapered portion 34a at a free end thereof in order to cause the forming rod 34 to be easily entered into the cnetral opening defined by the inner core surface 10.

The first flat plate 30 includes a circular opening 30a vertically aligned with the forming rod 34 extended through the second flat plate 32 and having a suitable clearance relative to the outside diameter of the rod 34. Further, the stationary bed includes a circular recess located under beneath the opening 30a and somewhat larger in diameter than the latter.

The operation of the arrangement shown in FIG. 5 will now be described with reference to FIGS. 6 and 7. It is assumed that the second flat plate 32 and the forming rod 34 are secured to the hydraulic press so as to be individually subjected to the hydraulic control, to enable them to be moved independently of each other. In FIG. 6 wherein there is illustrated a first step of the forming method according to the present invention, a stator core 100 such as shown in FIGS. 1 and 2 is sandwiched between the first and second flat plates 30 and 32 respectively while no pressure is applied to both flat plates 30 and 32. Alternatively, even if a pressure is applied to both plates, the magnitude thereof is relatively small and preset not to impede the radially outward movement of the surfaces of the first and last convolutions of the magnetic strip due to the forming rod 34 radially outwardly forcing the inner core surface 10. Under these circumstances, the forming rod 34 is forced into the central opening of the core 100 to spread the inner opening core surface 10 radially outwardly and, as will be apparent, to allow the outer periphery of the core to spread outwardly freely. Then a predetermined pressure is applied across both flat plates 30 and 32 having the core 100 sandwiched therebetween to remove differences in level at both the beginning 20 and the finish 22 of the spirally wound magnetic strip.

After the differences in level have been removed, the forming rod 34 is pulled out from the core 100 as shown in FIG. 7 wherein there is illustrated a second step of the forming method of the present invention and wherein like reference numerals designate components identical to those shown in FIG. 6. Then the pressure is released from the second flat plate 32 to complete the forming process.

Description will now be made of the reasons why forcing the forming rod 34 into the central opening on the core 100 can substantially remove variations of the inside diameter of the central opening caused during the spiral winding of the magnetic strip.

The forming rod 34 is forcedly inserted into the central opening of the core 100 to apply to the core 100 a radially outwardly directed, internal pressure $P_1$ designated by the reference numeral 36 in FIG. 8 wherein the upper surface of the core is partly illustrated. The internal pressure $P_1$ is attended with a tensile stress developed in the circumferential direction of the core 100 within the continuous portion 16 as designated by the reference numeral 38 in FIG. 8. From FIG. 8 it is seen that the theory of thick-walled hollow cylinders referred to in dynamics is substantially applicable to stator cores produced in accordance with the present invention. Such dynamics teaches that, with the tensile stress exceeding the elastic limit, and upon removing the internal pressure $P_1$ attended with no plastic deformation, the continuous portion 16 is substantially restored by an elastic deformation thereof alone.

That is, by plotting a tensile stress in the ordinate against a deformation in the abscissa as shown in FIG. 9, it is seen that a magnitude restored within the elastic limit is substantially constant in spite of the magnitude of plastic deformation. More specifically, when the plastic deformation is relatively small or when the outside diameter of the forming rod 34 is slightly larger than the inside diameter of the core 100 before its forming, the core 100 has been deformed to a point 40 shown in FIG. 9, while the same has been deformed to a point 42 shown in FIG. 9 when the particular plastic deformation is large or when the inside diameter of the core 100 is smaller. After the forming rod 34 has been removed from the core 100, the points 40 and 42 are restored to points 40a 42a respectively and restored magnitudes are expressed by segments of line 40b and 42b respectively (see FIG. 9). It is seen that the segment of line 40b is substantially equal to the segment of line 42b. Since the outside diameter of the punch 34 remains fixed, it will readily be understood that, even though variations in the inside diameter of the core 100 would have caused different plastic deformations on different portions of the core, variations in the inside diameter are extremely small after the forming operation.

Further, as the forming rod 34 is forced into the central core opening to compress radially outwardly the core 100, the inner core surface 10 is prevented from radially outwardly inclining relative to the original axis of the core. Therefore it is to be understood that any additional working such as above described in conjunction with FIG. 4 is not required.

FIG. 10 shows a modification of the present invention wherein the continuous portion 16 of the core 100 is intentionally provided with a plurality of portions low in physical strength to improve the resulting laminated structure through the utilization of plastic deformation. As shown in FIG. 10, a plurality of substantially semicircular notches 16a are disposed at substantially equal angular intervals on the outer core surface 18 to be extended axially throughout the axial length of the core 100. Thus the notches 16a alternate with portions 16b of the core 100 which retain the original dimension and serve to decrease the physical strength of the circumstantial continuous portion 16.

In FIG. 11, a hatched trapezoid shows a section of each convolution of the magnetic strip before the forming operation as taken along the line A—A of FIG. 10, and a white rectangle shows that as taken along the line B—B of FIG. 10. From FIG. 11 it is seen that, during the spiral winding operation, the magnetic strip is concentrically bent at each notch 16a so that the continuous portion of each convolution on each section A—A includes a portion increased in thickness as compared with the original thickness of the unwound magnetic strip while a very small spacing is formed at each section B—B between the adjacent convolutions. As above described in conjunction with FIGS. 5 through 7, the forming rod 34 is forced into the central opening on the core 100 to develope an internal pressure $P_1$ in the core (see the arrow 36, FIG. 10). This results in a tensile stress (see 38, FIG. 10) appearing at the continuous core portion 16. Under these circumstances, the plastic deformation is principally developed on each section A—A alone while the deformation is relatively small on each section B—B. As a result, the contraction is principally caused on each section A—A so that those portions of each strip convolution increased in thickness as above described approach the original strip thickness after the forming resulting in the disappearance of obstacles interfering with the stacking or layering as shown in FIG. 12 employing the same notations as shown in FIG. 11. From FIG. 12 it is seen that the adjacent convolutions of the magnetic strip can be intimately contacted by each other on each section B—B.

FIG. 13 shows a modification of the forming rod 34. In FIG. 13, the stator core 100 is identical to that shown in FIG. 10 and the forming rod 34 includes a plurality of axial keys 34b radially outwardly extended from the outer surface thereof and at equal angular intervals equal to those for the gap 14. Each key 34b has a circumferential width substantially equal to that of the gap on the inner core surface.

When the forming rod 34 is forced into the central core opening, the keys 34b are simultaneously forced into the associated gaps 14 to prevent the teeth 13 from radially tilting upon compression of the teeth by flat plates 30 and 32 (see FIG. 5).

From the foregoing it is seen that the present invention provides a method of manufacturing a stator core by spirally winding a magnetic strip, including the steps of rendering the resulting laminated structure of the core stable and effectively forming the core by using a special forming rod. Therefore the core includes an inner surface formed with high accuracy, and productivity can be increased because the additional working previously required becomes unnecessary.

We claim:

1. A method of manufacturing a stator core, said method comprising:
   spirally winding a magnetic strip having on one edge thereof alternate teeth and gaps to form a generally cylindrical spiral core member having a circumferential continuous portion, with said teeth and gaps of each convolution of said spiral core member being aligned axially thereof, with said aligned teeth extending radially inwardly from said circumferential continuous portion to form an inner substantially cylindrical surface defining a circular central opening, and with said aligned gaps extending radially outwardly from said central opening and said inner substantially cylindrical surface;
   forcing a cylindrical tool, having a diameter larger than the diameter of said central opening, into said central opening, and thereby forcing said inner cylindrical surface radially outwardly to enlarge the diameter thereof, while allowing the outer periphery of said spiral core member to freely spread radially outwardly; and
   compressing said spiral core member axially thereof, with said cylindrical tool maintained within said central opening, to form a core, and thereby imparting to said circumferential continuous portion a permanent strain sufficient to maintain the inner diameter of said core at a predetermined magnitude after the removal of said cylindrical tool.

2. A method of manufacturing a stator core as claimed in claim 1, wherein said circumferential continuous portion includes on the outer periphery thereof a plurality of notches extending throughout the axial length of said core, thereby developing permanent strains concentrically of said central opening to maintain said inner diameter of said core at said predetermined magnitude.

3. A method of manufacturing a stator core as claimed in claim 1 or claim 2, wherein said cylindrical tool comprises a forming cylindrical rod.

4. A method of manufacturing a stator core as claimed in claim 3, wherein said forming cylindrical rod includes a tapered portion at an extremity thereof.

5. A method of manufacturing a stator core as claimed in claim 1 or 2, wherein said cylindrical tool comprises a forming cylindrical rod including a plurality of radial keys, one of each group of said axially aligned gaps, and further comprising forcing said keys into said gaps on said inner cylindrical surface of said core to ensure axial alignment of said teeth.

6. A method of manufacturing a stator core as claimed in claim 5, wherein said radial keys are simultaneously inserted into said gaps.

7. A method of manufacturing a stator core as claimed in claim 5, wherein each said radial key has a circumferential width substantially equal to that of said gap on said inner cylindrical surface of said core.

8. A method of manufacturing a stator core as claimed in claim 1, further comprising the steps of pulling out said cylindrical tool from said central opening of said core, and thereafter releasing said core from said compression.

* * * * *